United States Patent [19]
Lane, Sr.

[11] Patent Number: 5,438,311
[45] Date of Patent: Aug. 1, 1995

[54] ANTI-CARJACKING DEVICE TRIGGERED BY A SWITCH IN THE SEAT BELT LATCH

[76] Inventor: Donald W. Lane, Sr., 338 Joe Joyner Rd., Atoka, Tenn. 38004

[21] Appl. No.: 14,133

[22] Filed: Feb. 5, 1993

[51] Int. Cl.$^6$ ............................................. B60R 25/00
[52] U.S. Cl. .................................... 340/426; 340/430; 180/287
[58] Field of Search .................. 340/426, 430, 438; 307/10.1, 10.2, 10.3; 180/286, 287, 289

[56] References Cited

U.S. PATENT DOCUMENTS

| | | | |
|---|---|---|---|
| 3,656,100 | 4/1972 | Beltrami | 307/10.3 |
| 3,735,346 | 5/1973 | Fox | 180/287 |
| 3,781,789 | 12/1973 | Caleskie et al. | 340/64 |
| 3,781,854 | 12/1973 | Kaufman et al. | 340/430 |
| 4,133,410 | 1/1979 | Krusoe | 180/114 |
| 4,712,477 | 12/1987 | Aikou et al. | 102/206 |
| 4,745,897 | 5/1988 | Tejeda | 123/198 B |
| 5,319,351 | 6/1994 | Beezley, Jr. | 340/426 |
| 5,335,748 | 8/1994 | Wilson | 180/270 |

Primary Examiner—James J. Groody
Assistant Examiner—Nathan J. Flynn
Attorney, Agent, or Firm—Walker, McKenzie & Walker

[57] ABSTRACT

An anti-carjacking circuit for disabling a motor vehicle after the driver of the vehicle has been unwillingly forced to exit the vehicle. The circuit includes: a sensor for sensing the exit of the driver, as by detecting the opening of the seat belt or, alternatively, the opening of the seat belt together with the driver's door; a latching memory such as a relay, responsive to the sensor, for recording the exit of the driver from the vehicle while the motor of the vehicle is powered; a delay circuit such as a comparator sensing the voltage across a capacitor charged by a resistor, responsive to the latching memory and startable thereby, for indicating the passage of a predetermined period of time after the starting thereof; and a disabling circuit, such as a relay, responsive to the indication by the delay circuit of the passage of the predetermined delay period, for disabling the motor of the motor vehicle as by breaking the ignition coil's circuit and possibly sounding an alarm. A hidden reset switch may also be included for resetting the circuit in case it is accidentally tripped, as might happen if the driver forgot to turn the engine off before removing the seat belt.

5 Claims, 3 Drawing Sheets

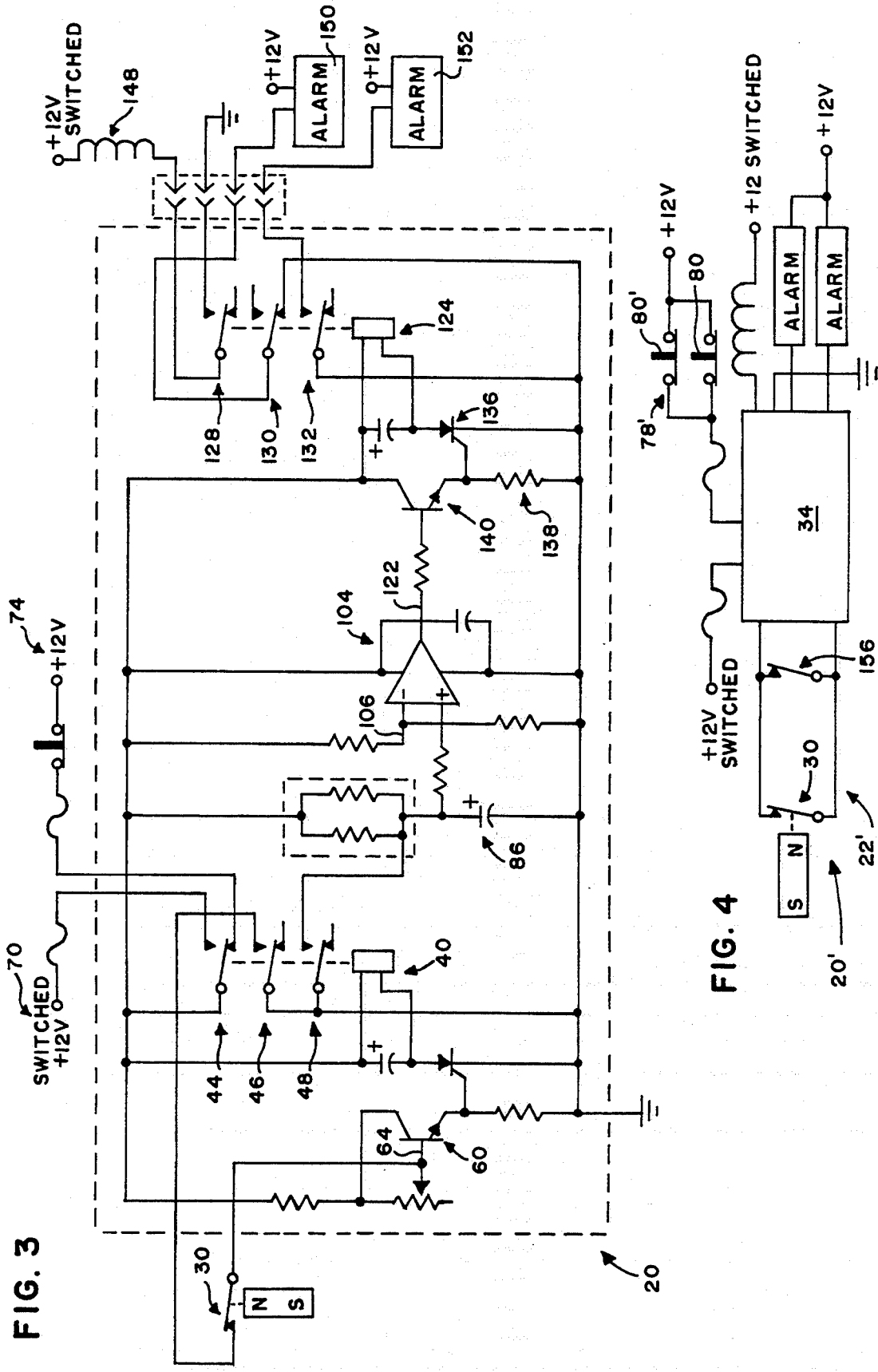

ANTI-CARJACKING DEVICE TRIGGERED BY A SWITCH IN THE SEAT BELT LATCH

BACKGROUND OF THE INVENTION

1. Field of the Invention

The present invention relates, in general, to vehicle theft prevention devices, and in particular, to devices for preventing theft of a vehicle whose engine is already running.

2. Information Disclosure Statement

The incidence of armed vehicle theft has risen to epidemic proportions in this country. If the driver attempts to thwart the theft, he or she may well be killed or seriously injured by the thief or thieves. The well-known solutions for preventing theft of a parked vehicle, such as locks or hidden switches or other engine-disabling devices, are all intended to disable the vehicle only while it is parked with the engine off. However, such devices are of little use once the vehicle's engine has been started and the driver's keys are in the ignition.

Additionally, if a theft-prevention device were to immediately disable a running vehicle when thieves forcefully ejected the driver during a so-called "carjacking" attempt, the angry and frustrated thieves could become vengeful and then kill or seriously injure the driver in retaliation.

It is therefore desirable to have an anti-carjacking device that becomes automatically engaged when the driver of a vehicle is compelled to exit the vehicle while the vehicle's engine is running. Such a device should not actually disable the vehicle until the thieves have driven a safe distance from the ejected driver, to prevent retaliation by the thieves to the driver. Furthermore, it is desirable that such a device should not require cumbersome or habitual arming procedures to be performed by the driver, and should not interfere with normal operation of the vehicle, but instead wait unobtrusively for the driver to be unwillingly ejected from the running vehicle. Such a device preferably should be attachable to any type of a gasoline or diesel motor-operated vehicle such as buses, cars, trucks, any other motor vehicles well-known to those skilled in the art.

A preliminary patentability search in Class 307, subclasses 10.2 and 10.3, produced the following patents, some of which may be relevant to the present invention: Caleskie et al., U.S. Pat. No. 3,781,789, issued Dec. 25, 1973; Krusoe, U.S. Pat. No. 4,133,410, issued Jan. 9, 1979; and Tejeda, U.S. Pat. No. 4,745,897, issued May 24, 1988. None of these patents disclose or suggest the present invention.

SUMMARY OF THE INVENTION

The present invention is an anti-carjacking circuit for disabling a motor vehicle after the driver of the vehicle has been unwillingly forced to exit the vehicle. The invention includes: sensing means for sensing the exit of the driver, as by detecting the opening of the seat belt; latching memory means such as a relay, responsive to the sensing means, for recording the exit of the driver from the vehicle while the motor of the vehicle is powered; delay means, responsive to the latching memory means and startable thereby, for indicating the passage of a predetermined period of time after the starting thereof; and disabling means, responsive to the indication by the delay means of the passage of the predetermined delay period, for disabling the motor of the motor vehicle and possibly sounding an alarm. The invention may also include a hidden reset switch for resetting the circuit in case it is accidentally tripped, as might happen if the driver forgot to turn the engine off before removing the seat belt.

In normal operation, the driver fastens the seat belt, starts the engine, and drives to a destination, then shuts the engine off and then unfastens the seat belt. Such operation will not cause the invention to disable the vehicle's motor.

However, if unwillingly forced to exit the vehicle by thieves or thugs while the motor is running, the driver will unhook the seat belt, thereby triggering the invention, and, after a predetermined delay period, during which the thieves drive away and leave the driver behind, the invention will disable the motor, as by breaking the ignition circuit, and could sound an alarm.

It is an object of the present invention to disable the motor of a motor vehicle when the driver is forced to exit the vehicle while the motor is running. To prevent retaliation upon the driver by frustrated thieves, it is an object of the invention only to disable the motor of the motor vehicle after a predetermined delay, triggered by the forced exit of the driver, during which the thieves are allowed to drive a substantial distance from the driver. A further object of the invention is that the operation thereof be automatic and unobtrusive to normal operation of the vehicle.

BRIEF DESCRIPTION OF THE DRAWINGS

FIG. 3 is still another electrical schematic of the present invention, but shown in the "disabling" state.

FIG. 4 is another electrical schematic of the present invention, showing an alternate interconnection scheme.

DESCRIPTION OF THE PREFERRED EMBODIMENT

Figure 1:
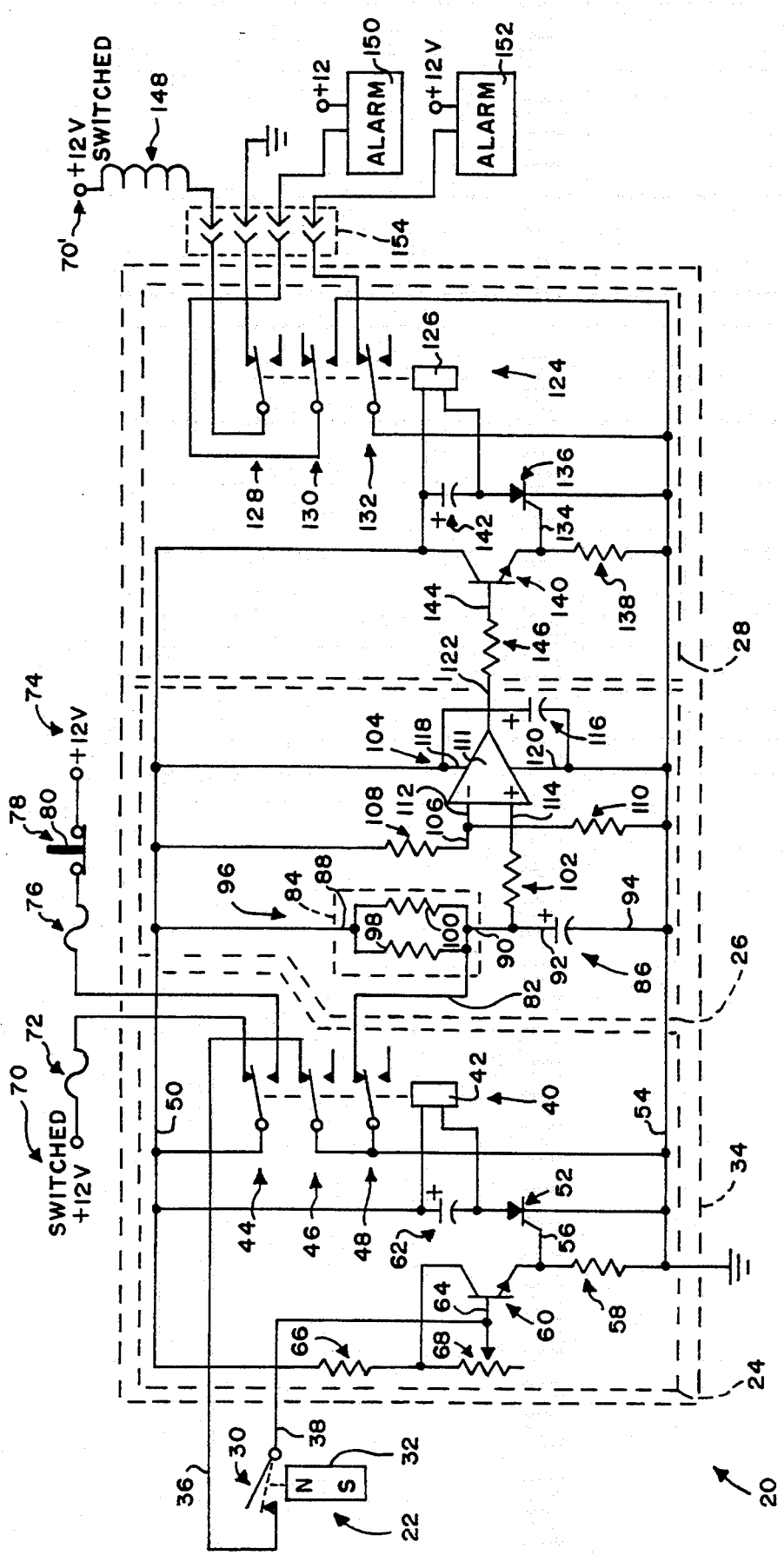
FIG. 1 is an electrical schematic of the present invention showing the various interconnections, with the invention shown in the "armed" state.

Referring to FIG. 1, anti-carjacking circuit 20, for disabling a motor vehicle after the driver of the motor vehicle has been unwillingly forced to exit the motor vehicle, is seen to comprise sensing means 22 for sensing the exit of the driver from the motor vehicle; latching memory means 24, responsive to sensing means 22, for recording the exit of the driver from the motor vehicle while the motor of the motor vehicle is powered; delay means 26, responsive to latching memory means 24 and startable thereby, for indicating the passage of a predetermined period of time after the starting thereof; and disabling means 28, responsive to the indication by delay means 26 of the passage of said predetermined period of time, for disabling the motor of the motor vehicle.

Sensing means 22 is preferably a normally-open magnetically-operated switch 30 that becomes closed when a magnet 32 becomes in close proximity therewith. Preferably, one of switch 30 or magnet 32 is permanently mounted, by means well-known to those skilled in the art, on the seat belt buckle of the driver's seat belt (not shown) of the motor vehicle, and the other of switch 30 or magnet 32 is permanently mounted, again by means well-known to those skilled in the art, to the seat belt tongue (not shown) that is latchingly inserted into said seat belt buckle. Many other equivalent switches, well-known to those skilled in the art, to magnetically-operated switch 30 serve the requirements of the present invention, and the essential function performed by such a switch 30 is to provide an indication whether the driver is in the driver's seat or not. For example, a weight-activated switch connected to the driver's seat, in a manner well-known to those skilled in the art, for sensing when the driver's weight is bearing down on the seat cushion, could serve the requirements of the present invention equally well.

Latching memory means 24, delay means 26, and disabling means 28 are preferably placed together on a circuit board or in a box, diagrammatically shown as dashed box 34, and are hidden in an inconspicuous and inaccessible location within the motor vehicle such as under the hood or behind the dashboard, with various connections running thereto and therefrom in a manner hereinafter explained, such as, for example, wires 36 and 38 connecting switch 30 to latching memory means 24.

As shown in FIG. 1, latching memory means 24 preferably comprises a well-known three-pole, double throw (3PDT) relay 40 having a coil 42 and three sets of single-pole, double throw (SPDT) contacts, 44, 46, and 48. As shown, one side of coil 42 is connected to upper supply rail 50 for receiving a source of power as hereinafter explained, and the other side of coil 42 is connected through silicon-controlled rectifier (SCR) 52 to lower supply rail or ground 54. The gate 56 of SCR 52 senses the voltage drop across emitter resistor 58 of NPN transistor 60, such that, when transistor 60 is passing current through emitter resistor 58, SCR 52 will be gated on, thereby energizing coil 42 of relay 40 in a manner now understood by those skilled in the art. Emitter resistor 68 is preferably a 560 ohm resistor. Preferably, an electrolytic capacitor, such as 47 microfarad capacitor 62, is also provided across coil 42.

As shown in FIG. 1, the base 64 of transistor 60 is biasingly pulled up to supply rail 50 by biasing resistor 66 and biasing potentiometer 68 so that, when switch 30 does not ground the base 64 of transistor 60 in a manner hereinafter described, transistor 60 is placed into saturation as resistors 66 and 68 pull base 64 toward supply rail 50, causing SCR 52 to energize coil 42, and further so that, when switch 30 does ground the base 64 of transistor 60, transistor 60 is placed into cutoff, causing SCR 52 to de-energize coil 42. Resistor 66 is preferably a 1 kilohm resistor, and resistor 68 is preferably a 50 kilohm potentiometer.

In the preferred embodiment, supply rail 50 is selectively connected through first set of contacts 44 of relay 40 either to the well-known "switched twelve-volt supply" 70 of the vehicle, as through a fuse 72 to the well-known switched output of the ignition switch (not shown) of the vehicle, or, when coil 42 is energized, to the well-known "unswitched twelve-volt supply" 74 (usually, a direct connection to the battery) of the vehicle, as through a fuse 76. Additionally, reset means 78, such as a normally-closed reset pushbutton 80 interposed between unswitched supply 74 and latching memory means 24, may also be provided in a manner hereinafter explained.

The second set of contacts 46 for relay 40 completes the circuit through switch 30 to ground 54 when relay 40 is de-energized, thereby allowing switch 30, when closed, to ground the base 64 of transistor 60. The third set of contacts 48 for relay 40 selectively grounds and ungrounds signal node 82 passed between latching memory means 24 and delay means 26, as hereinafter described.

As shown in FIG. 1, delay means 26 preferably comprises a delay resistor 84 and a delay capacitor 86, connected in series as shown between supply rail 50 and ground 54, with first end 88 of delay resistor 84 being connectable to a charging voltage such as, for instance, unswitched twelve-volt supply 74 or switched twelve-volt supply 70, through first set of contacts 44. The second end 90 of delay resistor 84 and the first end 92 of delay capacitor 86 are joined at signal node 82, and the second end 94 of capacitor 86 is connected to ground 54, thereby forming an "RC timing circuit" 96 that, when node 82 is ungrounded and first end 88 of resistor is connected to a charging voltage, causes capacitor 86 to become charged through resistor 84, with the voltage at node 82 rising exponentially from the ground potential of ground 54 to the charging voltage potential of supply rail 50 in a manner now understood by those skilled in the art. In the preferred embodiment shown in FIG. 1, delay resistor 84 is constructed in the well-known manner from two parallel resistors 98 and 100, respectively having values of 3.9 megohms and 2.2 megohms, for a parallel combined equivalent resistance of 1.41 megohms for delay resistor 84. Capacitor 86 is preferably a 100 microfarad capacitor.

By reference to FIG. 1, it will be understood that delay means 26 is responsive through node 82 to set of contacts 48 of latching memory means 24, and that capacitor 86 will not start charging until node 82 becomes ungrounded by the energizing of relay 40.

Sensing the voltage across capacitor 86 as through an input resistor 102, preferably a 1 kilohm resistor, is comparator means 104 for detecting the charging of capacitor 86 past a predetermined threshold voltage at node 106. The predetermined threshold voltage at node 106 is set by divider resistors 108 and 110, connected in series between supply rail 50 and ground 54, with resistors 108 and 110 being preferably equal, such as 3.9 kilohms apiece, thereby causing the reference voltage at node 106 to be one-half the voltage of supply rail 50, or six volts. Comparator means 104 is preferably a well-known 741 operational amplifier 111 having its negative input 112 connected to the threshold voltage at node 106 and having its positive input 114 connected through input resistor 102 to the voltage across capacitor 86 at node 82, and preferably, operational amplifier 111 has a 0.22 microfarad decoupling capacitor 116 across its supply connections, 118 and 120, respectively, to supply rail 50 and ground 54.

It will now be understood that comparator means 104 not only is for detecting the charging of capacitor 86 past the predetermined threshold voltage at node 106, but is also for indicating, as by the transition of output 122 of operational amplifier 111 from a low voltage near ground 54 to a high voltage near supply rail 50, the passage of a predetermined period of time, as set by the time constant of RC timing circuit 96, with said predetermined period of time being the time required for capacitor 86 to charge from zero volts to past the threshold voltage at node 106. In the preferred embodiment, the time constant of RC timing circuit 96, as set by resistor 84 and capacitor 86, is chosen so that it takes approximately 90 seconds of charging time for the voltage across capacitor 86 to rise from ground to above the threshold voltage at node 106, allowing, in a manner hereinafter described, thieves to drive away from the forcefully ejected driver of the vehicle before the vehicle becomes disabled.

As shown in FIG. 1, disabling means 28 preferably includes a well-known three-pole, double throw (3PDT) relay 124 having a coil 126 and three sets of single-pole, double throw (SPDT) contacts 128, 130, and 132. As shown, one side of coil 126 is connected to supply rail 50 for receiving a source of power, as hereinafter explained, and the other side of coil 126 is connected through silicon-controlled rectifier 136 to ground 54. The gate 134 of SCR 136 senses the voltage drop across emitter resistor 138 of NPN transistor 140, such that, when transistor 140 is passing current through emitter resistor 138, SCR 136 will be gated on, thereby energizing coil 126 of relay 124 in a manner now understood by those skilled in the art. Emitter resistor 138 is preferably a 33 ohm resistor. Preferably, an electrolytic capacitor, such as 470 microfarad capacitor 142, is also provided across coil 126.

As shown in FIG. 1, the base 144 of transistor 140 senses the indication by delay means 26 that the predetermined period of time has passed, as, for instance, by sensing through input resistor 146 the output 122 of comparator means 104. It will be understood by those skilled in the art that, when output 122 is at ground potential, transistor 140 will be in cutoff, thereby causing no substantial current to flow through emitter resistor 138, thereby causing SCR 136 to not energize relay 124. Alternately, when output 122 approaches the voltage of rail 50, transistor 140 will become saturated, thereby causing current to flow through emitter resistor 138, thereby causing SCR 136 to energize relay 124.

The motor vehicle includes a well-known ignition coil's primary 148 interposed between the "switched twelve-volt" supply 70' of the vehicle and ground. For clarity in the schematic, the switched twelve-volt supplies 70 and 70' are shown separately, but it shall be understood that they preferably are the same connection as, for example, to the ignition switch or a relay controlled thereby. Also in series with ignition coil 148, though not shown in FIG. 1 for clarity, are well-known "points" or contacts, typically located on the distributor of the motor, for opening and closing the current path through coil 148 in order to cause current gradients therethrough, thereby producing high-voltage pulses from the secondary of the ignition coil, in a manner well-known to those skilled in the art.

First set of contacts 128 of relay 124 is connected in series with the primary of ignition coil 148, thereby preventing current from flowing through the primary of ignition coil 148 when contacts 128 are opened (as when relay 124 is energized). It will now be understood by those skilled in the art that this opening or interrupting of the current path through ignition coil 148 disables the motor of the motor vehicle from operating. Additionally, an alarm, well-known to those skilled in the art such as alarm 150 or alarm 152, may be connected through normally-open contacts 130 or normally-closed contacts 132, for activation when relay 124 energizes. Some alarms, such as alarm 150, become activated when one connection thereto is grounded. For this purpose, normally-open contacts 130 are provided. Similarly, some alarms, such as alarm 152, become activated when one connection thereto is ungrounded. For this purpose, normally-closed contacts 132 are provided. The wiring to ignition coil 148 and alarms 150 and 152 is preferably through a hidden well-known terminal strip 154.

The operation of circuit 20 will now be explained. Initially, the state of the circuit is as shown in FIG. 1. The ignition switch to the car is off and the seat belt is unbuckled, so the switched twelve-volt supply 70 is off and switch 30 is open. Because the switched twelve-volt supply 70 is off, both relays 40 and 124 are de-energized.

When the driver enters the car, he or she first buckles the seat belt, thereby closing switch 30. The driver then turns on the ignition switch, thereby turning on the switched twelve-volt supply in a manner well-known to those skilled in the art. Because switch 30 is closed, the base of transistor 60 is grounded through contacts 46 of de-energized relay 40, so that, when switched twelve-volt supply 70 is turned on, no current flows through transistor 60, thereby causing SCR 52 to not energize relay 40.

Because relay 40 is not energized, supply rail 50 is connected to the switched twelve-volt supply 70 through contacts 44, and contacts 48 of relay 40 cause capacitor 86 to be discharged to ground. Because capacitor 86 is discharged, comparator means 104 does not indicate that the delay period has passed, and so output 122 is low, thereby causing transistor 140 to be cutoff, thereby causing no current to flow through emitter resistor 138, thereby causing SCR 136 to not energize relay 124, thereby causing contacts 128 to complete the circuit from ignition coil 148 to ground, thereby causing the motor of the vehicle to operate normally, and the motor will start and the driver proceeds on his or her way. This initial state of the circuit, as shown in FIG. 1, shall be known as the "armed" state, in which the circuit awaits a carjacking.

During normal operation, the driver will drive to the intended destination, switch off the ignition, thereby switching off the switched twelve-volt supply 70 and removing the power from supply rail 50, thereby causing relay 40 to remain de-energized, and then, and only then, the driver will unbuckle his or her seat belt, thereby opening switch 30.

Figure 2:
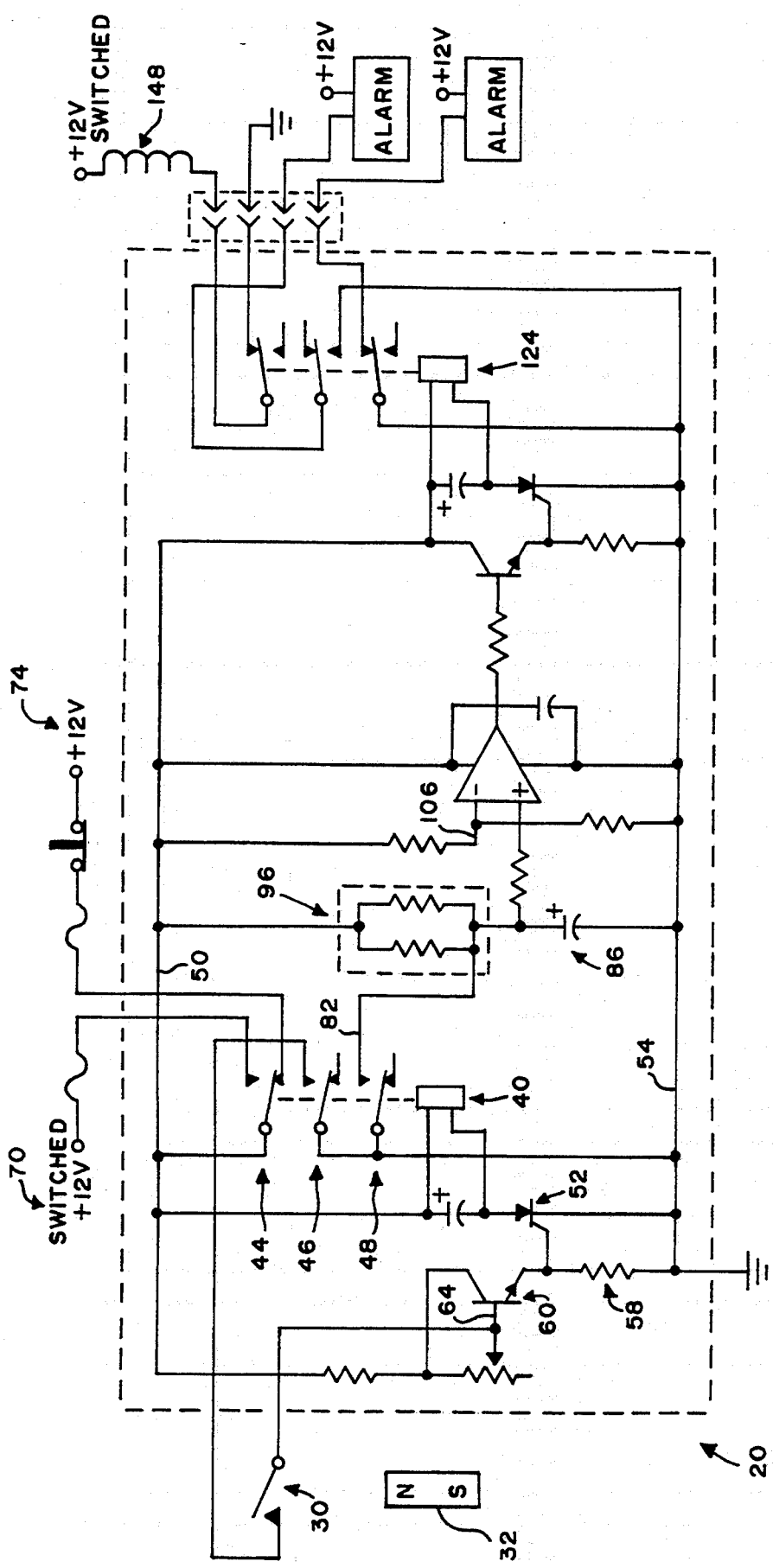
FIG. 2 is another electrical schematic of the present invention, but shown in the "tripped" state.

When accosted by thieves, however, the driver will be ordered to exit the vehicle, and will therefore obediently unbuckle the seat belt while the motor is still running, thereby causing switch 30 to open as magnet 32 becomes remote therefrom. This causes the base 64 of transistor 60 to become ungrounded, thereby causing transistor 60 to begin conducting current through emitter resistor 58, thereby causing SCR 52 to energize relay 40 as shown in FIG. 2. This state of the circuit, as shown in FIG. 2, shall be known as the "tripped" state, in which exit of the driver from the motor vehicle, while the motor is powered, has been recorded by latching memory means 24.

It is essential to the operation of circuit 20 that latching memory means 24 not only detect the opening of the seat belt while the motor is powered, as heretofore described, but also that latching memory means 24 record, in the sense of latchingly remembering, the event. Otherwise, thieves could simply re-buckle the seat belt and defeat the object of the present invention.

To this end, when relay 40 becomes energized as shown in FIG. 2, contacts 44 now supply power to supply rail 50 through unswitched twelve-volt supply 74 as shown. Furthermore, contacts 46 now interrupt the ground path to switch 30, thereby preventing switch 30, even if the seat belt becomes subsequently buckled, from grounding the base of transistor 60. Nor does turning the ignition switch off, thereby turning off switched twelve-volt supply 70, have any effect because power is now supplied to supply rail 50 of circuit 20 through contacts 44. Relay 40 is now permanently latched in the energized position unless, as hereinafter described, it becomes reset by the driver.

With relay 40 thus energized, node 82 becomes ungrounded through contacts 48, allowing RC circuit 96 to begin to charge capacitor 86. Because capacitor 86 has not yet charged past the predetermined threshold voltage at node 106, comparator means 104 does not yet indicate the passage of the predetermined delay time, and relay 124 remains de-energized as it previously was in FIG. 1, allowing the vehicle's motor to continue to operate normally because the current path through ignition coil 148 is not broken. In this "tripped" state, the unsuspecting thieves can then get into the vehicle and drive away, leaving the driver a safe distance behind.

When the voltage across capacitor 86 rises past the threshold voltage at node 106, comparator means 104 will so indicate the passage of the predetermined charging delay time by raising output 122 toward supply rail 50, thereby causing transistor 140 to pass current through emitter resistor 138, thereby causing SCR 136 to energize relay 124 as shown in FIG. 3. This state of circuit 20, with relay 124 energized, is known as the "disabling" state, because contacts 128 now interrupt the flow of current through the ignition coil 148. When circuit 20 enters this disabling state, the motor of the motor vehicle becomes disabled, with the thieves a distance from the driver (who has had a time in which to safely flee and call the police). Additionally, alarms 150 and 152 will be caused to sound, as by the connections respectively made or broken through contacts 130 and 132, and the thieves will flee. As previously described, it does not matter whether the thieves now switch the ignition off because supply rail is now powered by unswitched twelve-volt supply 74 through contacts 44. It similarly does not matter whether the seat belt is unfastened or fastened, because contacts 46 have removed the ground path through switch 30 to the base 64 of transistor 60. The vehicle remains disabled.

The only way to cause the circuit to leave this "disabling" state is through use of reset means 74 for resetting latching memory means 24, shown in FIG. 1, so that the recorded exit of the driver becomes unrecorded. Reset means 74, preferably a hidden normally-closed pushbutton switch 80 interposed between unswitched power supply 74 and latching memory means 24, when actuated, interrupts the connection between relay coil 42 and its source of power when energized, i.e., unswitched power supply 74. When the power to coil 42 is interrupted, relay 40 returns to the deenergized state shown in FIG. 1, provided that the power to the vehicle is switched off previously, and thereby causes the unbuckled state of the driver's seat belt with the motor running to become unrecorded. If, for example, the driver accidentally starts the vehicle's motor without first buckling his or her seat belt, the circuit 20 will enter the "tripped" state shown in FIG. 2, and the driver then must shut off the ignition (and, therefore, switched twelve-volt supply 70) and reset the latching memory means by finding and depressing pushbutton 80.

It shall now be understood by those skilled in the art that the present invention as heretofore described disables the motor of a motor vehicle by interrupting the current flow through the ignition coil 138. Alternatively, the connections shown in FIGS. 1–4 to the ignition coil could instead be in series with and go to the electric fuel pump of a diesel or gasoline motor, for interrupting the current flow through the fuel pump instead of through an ignition coil, thereby disabling the motor of the vehicle by starving the motor of fuel, in a manner that will now be apparent.

FIG. 4 shows a variation 20' of the present invention in which the sensing means 22' comprises not only seat belt switch 30, but also a door-operated switch 156. Switch 156 shall be understood to be open when the driver's door is open, but closed when the driver's door is closed. This variation of sensing means 22' causes the exit of the driver from the vehicle to be sensed only when both the driver's door is open and the seat belt is unfastened, in a manner that will now be apparent. Such a variation allows the driver to unfasten his or her seat belt, as, for instance at a toll booth, without triggering the latching memory means 24.

FIG. 4 also shows another variation, this time of reset means 78', in which a second hidden pushbutton switch 80' is placed in parallel with hidden pushbutton switch 80, thereby requiring that both pushbutton switches be found and simultaneously pressed to reset latching memory means 24. Such a variation of reset means 78' decreases the chances that a thief will discover and reset the circuit of the present invention before the police arrive.

Although the present invention has been described and illustrated with respect to a preferred embodiment and a preferred use therefor, it is not to be so limited since modifications and changes can be made therein which are within the full intended scope of the invention.

I claim:

1. An anti-carjacking circuit for disabling a motor vehicle's motor after the driver of the motor vehicle has been unwillingly forced to exit the motor vehicle, said motor vehicle including a driver's seat belt latch, said circuit being responsive to electrical power being applied to the motor vehicle's motor through normal operation of said motor vehicle and said circuit not requiring separate actuation of any alarm-enabling switch, said circuit comprising:
   (a) sensing means for sensing the exit of the driver from the motor vehicle, said sensing means comprising a seat belt switch means for sensing the opening of the seat belt latch;
   (b) latching memory means, responsive to said sensing means, for recording the exit of the driver from the motor vehicle while the motor of the motor vehicle is powered;
   (c) delay means, responsive to said latching memory means and startable thereby, for indicating the passage of a predetermined period of time after the starting thereof; and
   (d) disabling means, responsive to the indication by the delay means of the passage of said predetermined period of time, for disabling the motor of the motor vehicle.

2. The circuit as recited in claim 1, in which the motor vehicle further includes a driver's door, and said sensing means further comprises a driver's door switch means for sensing the opening of the driver's door, and in which said seat belt switch means and said driver's door switch means are operably interconnected so that said sensing means senses the exit of the driver only when the seat belt latch is opened and the driver's door is opened.

3. An anti-carjacking circuit for disabling a motor vehicle's motor after the driver of the motor vehicle has been unwillingly forced to exit the motor vehicle, said motor vehicle including an ignition coil interposed between a switched voltage and a ground potential and further including a seat belt latch, said circuit being responsive to the application of said switched voltage to said ignition coil through normal operation of said motor vehicle and said circuit not requiring separate actuation of any alarm-enabling switch, said circuit comprising:
(a) sensing means for sensing the exit of the driver from the motor vehicle, said sensing means comprising a seat belt switch means for sensing the opening of the seat belt latch;
(b) latching memory means, responsive to stud sensing means, for recording the exit of the driver from the motor vehicle while the motor of the motor vehicle is powered;
(c) delay means, responsive to said latching memory means and startable thereby, for indicating the passage of a predetermined period of time after the starting thereof, said delay means comprising;
  i. a delay resistor having a first end and a second end and being connectable at said first end to a charging voltage;
  ii. a delay capacitor having a first end connected to said second end of said delay resistor and having a second end connected to a ground potential; and
  iii. comparator means for detecting the charging by the charging voltage of said delay capacitor past a predetermined threshold voltage and for indicating the passage of said predetermined period of time when said delay capacitor has charged past said predetermined threshold voltage; and
(d) disabling means, responsive to the indication by the delay means of the passage of said predetermined period of time, for disabling the motor of the motor vehicle and for activating an alarm when the motor of the motor vehicle is disabled by said disabling means, said disabling means comprising interruption contact means, connectable in series with the ignition coil, for interrupting the flow of current through the ignition coil.

4. The circuit as recited in claim 3, in which said circuit additionally comprises hidden reset means for resetting said latching memory means by the driver so that said recorded exit of the driver becomes unrecorded.

5. The circuit as recited in claim 3, in which the motor vehicle further includes a driver's door, and said sensing means further comprises a driver's door switch means for sensing the opening of the driver's door, and in which said seat belt switch means and said driver's door switch means are operably interconnected so that said sensing means senses the exit of the driver only when the seat belt latch is opened and the driver's door is opened.

* * * * *